May 25, 1954 S. GILBERT 2,679,603
MOTOR ARMATURE BRAKE
Filed June 21, 1952
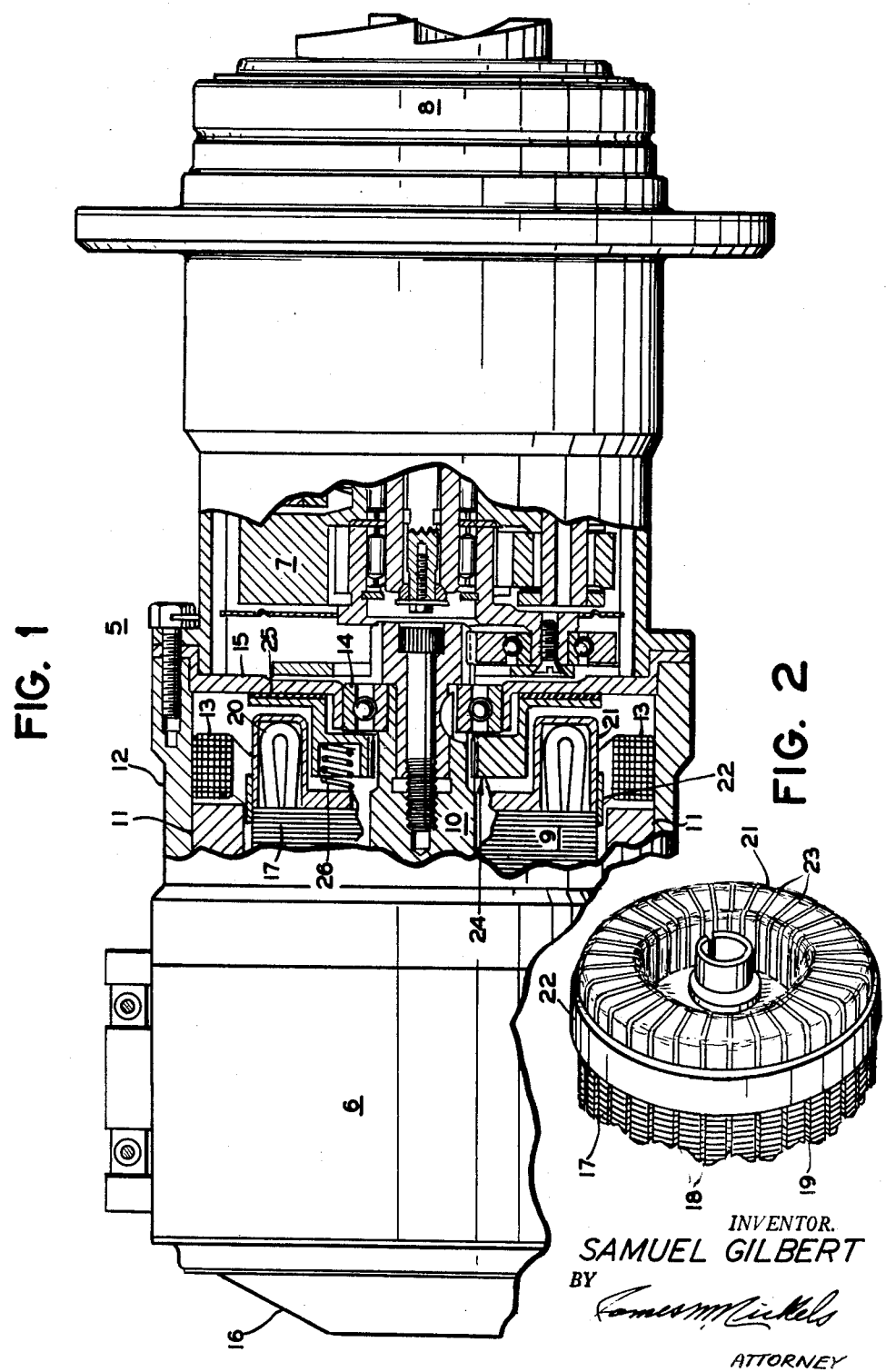
INVENTOR.
SAMUEL GILBERT
BY
ATTORNEY Patented May 25, 1954

2,679,603

UNITED STATES PATENT OFFICE 2,679,603

MOTOR ARMATURE BRAKE

Samuel Gilbert, Cedar Grove, N. J., assignor to Bendix Aviation Corporation, Teterboro, N. J., a corporation of Delaware Application June 21, 1952, Serial No. 294,894

2 Claims. (Cl. 310—77)

The present invention relates to electric motors and more particularly to a novel electromagnetic braking arrangement effective to stop and hold the output shaft of the motor upon deenergization thereof.

In some applications, it is desirable to stop the motor upon deenergization thereof and to restrain the armature from turning or creeping due to vibration or the like. Heretofore, it has been the practice to use a solenoid operated brake. However, when the motor is small, the brake mechanism would be large or out of proportion to the size of the motor. Often space limitations make the use of the solenoid operated brake objectional and impractical.

The present invention utilizes the magnetism in the armature core by means of a spider cup of magnetic material attached to the core and enclosing the winding tails of the armature. A ferrous brake shoe is slidably splined to the shaft and is adapted to be attracted to the spider cup upon energization of the motor thereby releasing the shaft for rotation.

An object of the invention is to provide a novel armature brake.

Another object of the invention is to provide a novel electromagnetic brake in which the armature magnetic field is utilized to actuate a brake shoe.

Another object of the invention is to provide novel braking means for a motor armature that is actuated automatically upon energization of the motor.

Another object of the invention is to provide simplified braking means for a motor armature.

The above and other objects and features of the invention will appear more fully hereinafter from a consideration of the following description taken in connection with the accompanying drawing wherein one embodiment of the invention is illustrated by way of example.

In the drawing:

Figure 1 is a partial cutaway view of an engine starter embodying the invention.

Figure 2 is an end view of the armature of Figure 1.

Referring to the drawing, a starter is indicated generally by the numeral 5. While a starter has been used to illustrate an application of the invention, it is understood that it is not limited thereto, but may be used in other motor applications. The starter 5 has a motor 6, gear train 7 and jaw mechanism 8. The gear train 7 and jaw mechanism will not be described in detail as they form no part of the present invention.

The motor 6 comprises a conventionally wound armature 9 suspended by a shaft 10 between pole pieces 11. The pole pieces 11 are secured to motor housing 12 and carry the stator windings 13. The shaft 10 is supported in bearings 14 mounted in end walls 15 and 16 of the motor housing 12. The end wall 16 and related bearing is not shown, but it is understood that they are of a conventional type.

The armature 9 comprises a laminated core 17 having slots 18 therein to receive armature windings 19. The windings 19 are formed with loops 20 extending beyond the core 17.

The novel braking arrangement of the present invention comprises a spider cup 21 of ferrous material secured to the core 17 by a band 22. The cup 21 has slots 23 therein to correspond to the slots 18 in the core 17. A ferrous brake shoe 24 is slidably splined to the shaft 10. The brake shoe 24 has an outwardly extending flange 25 which is adapted to coact with the wall 15 to restrain rotation of the shaft 10. The flange 25 and wall 15 may be provided with brake linings. The brake shoe 24 is biased into engagement with the wall 15 by springs 26 positioned between the cup 21 and the brake shoe 24.

In operation, upon energization of the motor 5, the brake shoe is drawn by the magnetic force set up in the spider cup 21 by the armature 9 against the bias of the springs 26 thus removing the brake shoe from contact with the wall 15. Upon deenergization of the motor 5, the brake shoe is urged by the springs 25 into engagement with the wall 15 for frictional engagement. Thus, when the motor is deenergized, the friction between the shoe 24 and the wall 15 prevents the shaft from turning. Upon energization of the motor, the magnetic attraction of the armature moves the shoe 24 out of engagement with the wall 15 permitting the shaft 10 to rotate without the frictional restraint.

Although only one embodiment of the invention has been illustrated and described, various changes in the form and relative arrangement of parts, which will now appear to those skilled in the art, may be made without departing from the scope of the invention.

What is claimed is:

1. A device for use in an electric motor having an armature core with winding slots therein, armature windings positioned in said slots, an armature shaft and a housing, comprising a cup-like member secured to the end of said armature and having slots therein in alignment with said winding slots, said cup-like member being so positioned to be effected magnetically by the current flowing in said windings, a brake member slidably splined to said armature shaft and normally biased into frictional engagement with said housing, and said brake member being responsive to the magnetic force exerted by said cup member upon the energization of said windings to overcome said bias and remove said friction engagement.

2. In an electric motor, the combination comprising a housing, an armature rotatably mounted in said housing and having an output shaft, said armature comprising a laminated core structure having winding slots therein, armature windings positioned in said slots and having loops extending therefrom, a cup-like member of ferrous material surrounding said loops and secured to said core structure, said cup-like member having openings therein to coincide with said winding slots, a brake member slidably secured to said shaft, spring means for biasing said brake member into frictional engagement with said housing, said cup-like member being responsive to energization of said armature windings to exert a magnetic pull upon said brake member to overcome said bias and move said brake member out of frictional engagement with said housing.

References Cited in the file of this patent

UNITED STATES PATENTS

| Number | Name | Date |
|---|---|---|
| 2,490,456 | Niederhiser | Dec. 6, 1949 |

FOREIGN PATENTS

| Number | Country | Date |
|---|---|---|
| 491,469 | Great Britain | Sept. 2, 1938 |
| 694,094 | Germany | July 25, 1940 |
| 671,205 | Germany | Feb. 2, 1939 |